United States Patent Office 3,026,303
Patented Mar. 20, 1962

3,026,303
POLYOXIME ESTERS
Lorraine Guy Donaruma, Woodbury, N.J., assignor to E. I. du Pont de Nemours and Company, Wilmington, Del., a corporation of Delaware
No Drawing. Filed Apr. 26, 1957, Ser. No. 655,193
16 Claims. (Cl. 260—78.4)

The present invention relates to new organic polymeric compositions and to a general method for preparing such compositions. More particularly, the present invention relates to polyoxime esters.

It is an object of the present invention to prepare new and useful polyoxime ester compositions. It is a further object of the present invention to produce new polymeric compositions which are useful as molding compositions and also for the preparation of pigments. It is a still further object of the invention to prepare these new and useful polymers in a simple and convenient way. Other and additional objects of the invention will become apparent from a consideration of the ensuing specification and claims.

The novel polymers of the present invention may be represented generally by the following formula:

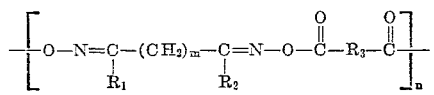

wherein each of $R_1$ and $R_2$ may be hydrogen, a lower alkyl radical, an aromatic radical, a heterocyclic radical, or wherein $R_1$ and $R_2$ are members of a single carbocyclic group; $R_3$ may be a methylene radical, a polymethylene radical, an alkenyl radical, a phenylene radical, or wherein $R_3$ represents merely a direct carbon-to-carbon bond between the two adjacent carbonyl groups; and $n$ is an integer greater than zero and $m$ is an integer less than two (including zero).

I prepare these polymers by condensing a polyfunctional oxime with a polybasic acid chloride. Briefly stated, a wide variety of polyfunctional oximes may be used including, for example, glyoxime and derivatives thereof obtained by replacing the $\alpha$-and/or $\beta$-hydrogen atoms of glyoxime with organic radicals, such as alkyl or aromatic radicals. The polybasic acid chloride may be the acid chloride of any common aliphatic or aromatic polybasic acid such as oxalic acid, succinic acid, adipic acid, sebacic acid, terephthalic acid, pyromellitic acid, etc. The acid may have any number of carboxyl groups provided only that it has more than one. A more complete understanding of the invention will be gained from a consideration of the following examples and discussion.

Example 1

0.1 mole (30.4 grams) of the disodium salt of dimethylglyoxime, prepared by the reaction of dimethylglyoxime with aqueous sodium hydroxide in the conventional manner, was suspended in 100 ml. of diethyl ether and 0.1 mole (16 grams) of succinyl chloride was added dropwise with vigorous agitation. The reaction mixture became warm and refluxed vigorously. When the addition of the acid chloride was complete, the mixture was stirred for two hours, was acidified with 10% HCl, and filtered. The filter cake was washed thoroughly with diethyl ether and then with hot water. The crude material was then dried in a vacuum oven to yield 11 grams of polydimethylglyoxime succinate.

The polydimethylglyoxime succinate melted at 160–225° C. and had an average molecular weight of about 600, as determined by freezing point depression and boiling point elevation measurements. The structure of the resin was verified by infrared spectrographic analysis as well as by hydrolytic cleavage with aqueous NaOH and identification of the co-monomers thus obtained.

Example 2

0.1 mole (11.6 grams) of dimethylglyoxime was dissolved in 100 ml. of diethyl ether and 16 ml. of pyridine was added to react with the HCl which is formed in the subsequent polymerization. To this mixture, 0.1 mole (16 grams) of succinyl chloride was added dropwise at a slow rate with vigorous agitation at or below a temperature of 10° C. The mixture was then diluted with a large excess of water and acidified strongly with HCl to a pH of 0–1. The liquid was removed by filtration and the filter cake was dissolved in chloroform. The chloroform solution was extracted with 10% HCl, washed with water and dried. The dry solution was concentrated by evaporation, and the polymer was precipitated by addition of an excess of diethyl ether. The polymer was dried in a vacuum drying oven, to yield 14.8 grams of polydimethylglyoxime succinate.

The polydimethylglyoxime succinate product melted at 198–209° C., and had an average molecular weight of about 1500, as determined by freezing point depression and boiling point elevation measurements. The structure of the resin was verified by infrared spectrographic analysis as well as by hydrolytic cleavage with aqueous NaOH and identification of the co-monomers thus obtained.

Example 3

0.1 mole (11.6 grams) of dimethylglyoxime was dissolved in 50 ml. of pyridine. To this mixture, 0.1 mole (16 grams) of succinyl chloride was added dropwise at a slow rate with vigorous agitation at or below a temperature of 10° C. The mixture was diluted with a large excess of water and acidified strongly with HCl to a pH of 0–1. The liquid was removed by filtration and the filter cake was dissolved in chloroform. The chloroform solution was extracted with 10% HCl, washed with water and dried. The dry solution was concentrated by evaporation, and the polymer was precipitated by addition of an excess of diethyl ether. The polymer was dried in a vacuum drying oven, to yield 9.6 grams of polydimethylglyoxime succinate.

The polydimethylglyoxime succinate product melted at 196–203° C., and had an average molecular weight of about 1500, as determined by freezing point depression and boiling point elevation measurements. The structure of the resin was verified by infrared spectrographic analysis as well as by hydrolytic cleavage with aqueous NaOH and identification of the co-monomers thus obtained.

Example 4

The nickel complex of dimethylglyoxime was prepared by the reaction of dimethylglyoxime with a dilute aqueous solution of nickel chloride at a pH of 6–7. The nickel complex, nickel (dimethylglyoxime)$_2$, is filtered, washed, and dried. One-half mole (145 grams) of this complex was suspended in 1000 ml. of pyridine, and stirred vigorously. The thick suspension which resulted was heated until the mixture became mobile. One mole (184 grams) of adipyl chloride was added dropwise at a fast rate. The mixture refluxed very violently and turned from a red to a gray color. The mixture was stirred until it cooled to room temperature, and was diluted with a large excess of water and acidified strongly with HCl to a pH of 0–1. The acid solution was then allowed to stand until the polymer was white in color. The liquid was removed by filtration and the filter cake was dissolved in chloroform. The chloroform solution was extracted with 10% HCl, washed with water, and dried. The dry solution was concentrated by evaporation, and the polymer was precipitated by addition of an excess of diethyl ether. The polymer was dried in a vacuum drying oven to yield 158 grams of polydimethylglyoxime adipate.

The polydimethylglyoxime adipate product melted at 166–169° C., and had an average molecular weight of about 1000, as determined by freezing point depression and boiling point elevation measurements. The structure of the resin was verified by infrared spectrographic analysis as well as by hydrolytic cleavage with aqueous NaOH and identification of the co-monomers thus obtained.

*Example 5*

0.1 mole (11.6 grams) of dimethylglyoxime was dissolved in 100 ml. of tetrahydrofuran and 25 ml. of pyridine was added to react with the HCl which is formed in the subsequent polymerization. To this mixture, 0.1 mole (19 grams) of adipyl chloride was added dropwise at a fast rate with vigorous agitation. The mixture refluxed violently, and was stirred until it cooled to room temperature. When cool, the mixture was diluted with a large excess of water and acidified strongly with HCl to a pH of 0–1. The liquid was removed by filtration and the filter cake was dissolved in chloroform. The chloroform solution was extracted with 10% HCl, washed with water, and dried. The dry solution was concentrated by evaporation, and the polymer was precipitated by addition of an excess of diethyl ether. The polymer was dried in a vacuum drying oven to yield 20 grams of polydimethylglyoxime adipate.

The polydimethylglyoxime adipate product melted at 145–150 C., and had an average molecular weight of about 700, as determined by freezing point depression and boiling point elevation measurements. The structure of the resin was verified by infrared spectrographic analysis as well as by hydrolytic cleavage with aqueous NaOH and identification of the co-monomers thus obtained.

*Example 6*

0.1 mole (30.4 grams) of the disodium salt of dimethylglyoxime, prepared by the reaction of dimethylglyoxime with aqueous sodium hydroxide in the conventional manner, was suspended in 100 ml. of diethyl ether and 0.1 mole (24 grams) of sebacyl chloride was added dropwise with vigorous agitation. The reaction mixture became warm and refluxed vigorously. When the addition of the acid chloride was complete, the mixture was stirred for two hours, was acidified with 10% HCl, and filtered. The filter cake was washed thoroughly with diethyl ether and then with hot water. The crude material was then dried in a vacuum oven. The dry product was next boiled with an excess of chloroform and filtered. The filtrate was concentrated by evaporation and the resinous product precipitated by the addition of an excess of diethyl ether. The resin was again filtered and dried in a vacuum drying oven to yield 23.8 grams of polydimethylglyoxime sebacate.

The polydimethylglyoxime sebacate melted at 115–130° C., and had an average molecular weight of about 900, as determined by freezing point depression and boiling point elevation measurements. The structure of the resin was verified by infrared spectrographic analysis as well as by hydrolytic cleavage with aqueous NaOH and identification of the co-monomers thus obtained.

*Example 7*

The nickel complex of dimethylglyoxime was prepared by the reaction of dimethylglyoxime with a dilute aqueous solution of nickel chloride at a pH of 6–7. The nickel complex, nickel (dimethylglyoxime)$_2$, precipitates, is filtered, washed and dried. 0.05 mole (14.5 grams) of this complex was suspended in 50 ml. of pyridine, and stirred vigorously. The thick suspension which resulted was heated until the mixture became mobile. 0.1 mole (24 grams) of sebacyl chloride was added dropwise at a fast rate. The mixture refluxed very violently and turned from a red to a gray color. The mixture was stirred until it cooled to room temperature, and was diluted with a large excess of water and acidified strongly with HCl to a pH of 0–1. The acid solution was then allowed to stand until the polymer was white in color. The liquid was removed by filtration and the filter cake was dissolved in chloroform. The chloroform solution was extracted with 10% HCl, washed with water, and dried. The dry solution was concentrated by evaporation, and the polymer was precipitated by addition of an excess of diethyl ether. The polymer was dried in a vacuum drying oven to yield polydimethylglyoxime sebacate.

The polydimethylglyoxime sebacate product melted at 100–125° C., and had an average molecular weight of about 1000, as determined by freezing point depression and boiling point elevation measurements. The structure of the resin was verified by infrared spectrographic analysis as well as by hydrolytic cleavage with aqueous NaOH and identification of the co-monomers thus obtained.

*Example 8*

The nickel complex of α-benzil dioximine was prepared by the reaction of α-benzil dioxime with a dilute aqueous solution of nickel chloride at a pH of 6–9. The nickel complex, α-nickel benzil dioxime, precipitates, is filtered, washed and dried. 0.1 mole (54 grams) of this complex was suspended in 300 ml. of pyridine, and stirred vigorously. The thick suspension which resulted was heated until the mixture became mobile. 0.2 mole (37 grams) of adipyl chloride was added dropwise at a fast rate. The mixture refluxed very violently and turned from an orange-brown to a gray color. The mixture was stirred until it cooled to room temperature, and was diluted with a large excess of water and acidified strongly with HCl to a pH of 0–1. The acid solution was then allowed to stand until the polymer was white in color. The liquid was removed by filtration and the filter cake was dissolved in chloroform. The chloroform solution was extracted with 10% HCl, washed with water, and dried. The dry solution was concentrated by evaporation, and the polymer was precipitated by addition of an excess of diethyl ether. The polymer was dried in a vacuum drying oven to yield 15 grams of polybenzildioxime adipate.

The polybenzildioxime adipate product melted at 74–79° C., and had an average molecular weight of about 850, as determined by freezing point depression and boiling point elevation measurements. The structure of the resin was verified by infrared spectrographic analysis as well as by hydrolytic cleavage with aqueous NaOH and identification of the co-monomers thus obtained.

*Example 9*

0.1 mole (24 grams) of α-benzil dioxime was dissolved in 100 ml. of pyridine. To this mixture, 0.1 mole (19 grams) of adipyl chloride was added dropwise at a fast rate with vigorous agitation. The mixture refluxed violently, and was stirred until it cooled to room temperature. When cool, the mixture was diluted with a large excess of water and acidified strongly with HCl to a pH of 0–1. The liquid was removed by filtration and the filter cake was dissolved in chloroform. The chloroform solution was extracted with 10% HCl, washed with water and dried. The dry solution was concentrated by evaporation, and the polymer was precipitated by addition of an excess of diethyl ether. The polymer was dried in a vacuum drying oven, to yield 30 grams of polybenzildioxime adipate.

The polybenzildioxime adipate product melted at 162–166° C., and had an average molecular weight of about 750, as determined by freezing point depression and boiling point elevation measurements. The structure of the resin was verified by infrared spectrographic analysis as well as by hydrolytic cleavage with aqueous NaOH and identification of the co-monomers thus obtained.

Example 10

0.1 mole ((22 grams) of α-furildioxime was dissolved in 100 ml. of pyridine. To this mixture, 0.1 mole (19 grams) of adipyl chloride was added dropwise at a fast rate with vigorous agitation. The mixture refluxed violently, and was stirred until it cooled to room temperature. When cool, the mixture was diluted with a large excess of water and acidified strongly with HCl to a pH of 0–1. The liquid was removed by filtration and the filter cake was dissolved in chloroform. The chloroform solution was extracted with 10% HCl, washed with water and dried. The dry solution was concentrated by evaporation, and the polymer was precipitated by addition of an excess of diethyl ether. The polymer was dried in a vacuum drying oven, to yield 20.4 grams of polyfurildioxime adipate.

The polyfurildioxime product melted at 61–67° C., and had an average molecular weight of about 650, as determined by freezing point depression and boiling point elevation measurements. The structure of the resin was verified by infrared spectrographic analysis as well as by hydrolytic cleavage with aqueous NaOH and identification of the co-monomers thus obtained.

Example 11

0.1 mole (8.8 grams) of glyoxaldioxime was dissolved in 50 ml. of pyridine. To this mixture, 0.1 mole (19 grams) of adipyl chloride was added dropwise at a fast rate with vigorous agitation. The mixture refluxed violently, and was stirred until it cooled to room temperature. When cool, the mixture was diluted with a large excess of water and acidified strongly with HCl to a pH of 0–1. The liquid was removed by filtration. The filter cake was dried in a vacuum drying oven to yield 10 grams of polyglyoxaldioxime adipate.

The polyglyoxaldioxime adipate product melted at 149–153° C. The structure of the resin was verified by infrared spectrographic analysis.

Example 12

0.1 mole (13 grams) of acetylacetone dioxime was dissolved in 50 ml. of pyridine. To this mixture, 0.1 mole (19 grams) of adipyl chloride was added dropwise at a fast rate with vigorous agitation. The mixture refluxed violently, and was stirred until it cooled to room temperature. When cool, the mixture was diluted with a large excess of water and acidified strongly with HCl to a pH of 0–1. The liquid was removed by filtration and the filter cake was dissolved in chloroform. The chloroform solution was extracted with 10% HCl, washed with water and dried. The dry solution was concentrated by evaporation and the polymer was precipitated by addition of an excess of diethyl ether. The polymer was dried in a vacuum drying oven to yield polyacetylacetone dioxime adipate.

The polyacetylacetone dioxime adipate product was liquid at room temperature and had an average molecular weight of about 900, as determined by freezing point depression and boiling point elevation measurements.

Example 13

0.2 mole (61 grams) of the disodium salt of dimethylglyoxime prepared by the reaction of dimethylglyoxime with aqueous sodium hydroxide in the conventional manner was suspended in 200 ml. of diethyl ether and 0.2 mole (31 grams) of fumaryl chloride was added dropwise with vigorous agitation. The reaction mixture became warm and refluxed vigorously. When the addition of the acid chloride was complete, the mixture was stirred for two hours, was acidified with 10% HCl and filtered. The filter cake was washed thoroughly with diethyl ether and then with hot water. The crude material was then dried in a vacuum oven to yield 39.5 grams of polydimethylglyoxime fumarate.

The product was not soluble in any common organic solvents, and was infusible. The structure of the resin was verified by infrared spectrographic analysis as well as by hydrolytic cleavage with aqueous NaOH and identification of the co-monomers thus obtained. Due to its unsaturation, the polydimethylglyoxime fumarate obtained in this example may be cross-linked in the conventional manner to enhance its mechanical stability, for example with a mono-olefin such as styrene or other vinyl compound, or with a di-olefin such as divinyl-benzene, butadiene, or the like. A typical technique for cross-linking this resin is illustrated by the following:

10 g. of the polydimethylglyoxime fumarate was dissolved in 100 ml. of nitrobenzene at 100° C. 2 g. of distilled styrene was added and then 0.2 g. of benzoyl peroxide. The mixture was held at 100–120° for three hours and then allowed to stand overnight at room temperature. The polymer was precipitated by adding hexane and was filtered. The solid product was washed with ether and dried in a vacuum drying oven. The 7 g. of material obtained did not melt and was insoluble in water and common organic solvents.

Example 14

41 grams of finely ground terephthaloyl chloride was added to an aqueous solution of 23.2 grams of dimethylglyoxime in 150 ml. of water containing 16 grams of sodium hydroxide. The mixture was stirred for four hours during which time the temperature rose from room temperature to 50° C. The mixture was then cooled, acidified with dilute HCl, and washed, first with diethyl ether and then with sodium bicarbonate solution.

The polydimethylglyoxime terephthalate was insoluble in all common organic solvents. The structure of the resin was verified by infrared spectrographic analysis.

Example 15

11.6 grams of dimethylglyoxime and 23.9 grams of sebacyl chloride in 100 ml. of tetrahydrofuran were refluxed for 24 hours, during which time a stream of dry nitrogen gas was blown through the mixture to flush away the hydrogen chloride formed by the reaction of the oxime and the acid chloride. The solvent was removed under vacuum, and the residue was dissolved in chloroform and filtered. The chloroform was then evaporated to yield 24.3 grams of polydimethylglyoxime sebacate.

The polydimethylglyoxime sebacate was a waxy resin having an average molecular weight of about 525, as determined by freezing point depression and boiling point elevation measurements. The structure of the resin was verified by infrared spectrographic analysis as well as by hydrolytic cleavage with aqueous NaOH and identification of the co-monomers thus obtained.

Example 16

To a solution of 14.2 grams of cyclohexanedionedioxime in 100 ml. of pyridine was added rapidly 18.3 grams of adipyl chloride. The mixture was stirred until it had cooled to room temperature and was drowned in water. The mixture was made strongly acid with hydrochloric acid, was extracted with chloroform, and the chloroform extract washed with 10% hydrochloric acid and then with water. The chloroform extract was dried, concentrated by evaporation, and the polymer precipitated by the addition of ether. The ether was removed by decantation and subsequent heating at 80° C. and 50 mm. pressure for 12 hours to yield 12.8 grams of solid polycyclohexanedionedioxime adipate melting at 60–140° C. The average molecular weight, determined cryoscopically in diphenylamine, was 630–695. The structure of the polymer was verified by its infrared spectrum.

Example 17

Example 15 was repeated except that the cyclohexanedionedioxime was replaced with a mixture of 24 grams of benzildioxime and 11.6 grams of dimethylglyoxime, and the amount of adipyl chloride used was 36.6 grams.

There was obtained 28 grams of a polymeric material melting at 75–80° C. and having an average molecular weight of 1230, determined cryoscopically in diphenylamine. The structure of the polymer was determined by infrared spectroscopy.

*Example 18*

The method of Example 17 was repeated except that the mixture of benzildioxime and dimethylglyoxime was replaced with 23.2 grams of dimethylglyoxime, and the 36.6 grams of adipyl chloride was replaced with a mixture of 18.3 grams of adipyl chloride and 23.9 grams of sebacyl chloride.

There was obtained 51.5 grams of a polymeric material melting at 115–121° C. and having an average molecular weight of 850, determined cryoscopically in diphenylamine. The structure of the polymer was determined by infrared spectroscopy.

As is illustrated by the foregoing examples, the method of the present invention for preparing the novel polyoxime esters comprises the condensation of a polyfunctional oxime with the acid chloride of a polybasic carboxylic acid.

The condensation may be represented by the following equation:

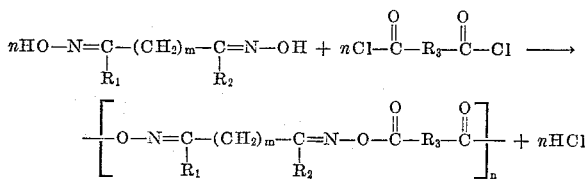

wherein $n$ is an integer greater than zero, and $m$ is an integer less than two (including zero).

In a suitable organic solvent, the condensation will proceed at room temperature. In order to obtain the polymeric product in high yields, it is desirable to remove or otherwise tie up the HCl which results from the polymerization. This may be accomplished in a variety of ways. For example, by starting with a metallic salt or complex of the oxime, such as the sodium salt or the nickel complex, the metallic chloride is produced which will precipitate out of the organic reaction mass. By an alternate technique, an HCl acceptor may be incorporated into the system, such as pyridine or an amine, to react with the HCl as it is formed. It is also possible to dissipate the HCl as a gas by flushing the reaction mass vigorously with dry gaseous nitrogen.

The polymerization may be performed in any suitable organic solvent which is inert with respect to the monomeric starting materials and the polymeric product including, for example, diethyl ether, tetrahydrofuran, dioxane, etc. Pyridine is an excellent solvent to use since it functions as an HCl acceptor as well.

The process of the present invention is operable for the preparation of a wide variety of polyoxime esters by the condensation of a polyfunctional oxime with the acid chloride of a polybasic acid. The oxime may be a simple dioxime like glyoxime or it may be more complex as in the case of derivatives of glyoxime obtained by replacing the α- and/or β-hydrogen atoms of glyoxime with organic substituents, such as alkyl, aromatic, alkaryl, aralkyl, alicyclic, or heterocyclic radicals. The acid chloride may be the derivative of any common aliphatic or aromatic dibasic acid, such as succinic acid or terephthalic acid, or it may be the derivative of other more complex carboxylic acids including the tri- and tetrabasic acids, such as trimellitic and pyromellitic acids.

It is thus apparent that $R_1$, $R_2$, and $R_3$ in the generic designation of the new polymers, above, may vary widely depending upon the polyfunctional oximes and the acid chlorides which are used in the condensation. For instance each of $R_1$ and $R_2$ may be the same or different alkyl radicals, aromatic radicals, alkaryl radicals, aralkyl radicals, heterocyclic radicals, or $R_1$ and/or $R_2$ may each be a hydrogen atom. $R_1$ and $R_2$ may also be components of a single carbocyclic group, such as a cyclohexylidene radical. Similarly, $R_3$ may be an alkyl radical, an alkenyl radical, an aromatic radical, an alkaryl radical, an aralkyl radical, or $R_3$ may represent a direct carbon-to-carbon single bond between the two adjacent carbonyl groups, as when oxalyl chloride is a co-monomer. It is thus within the scope of the present invention to prepare polymers by condensing, among others, any of the oximes in column 1 of the ensuing table with any of the acid chlorides in column 4. Columns 2, 3, and 5 indicate the nature of the $R_1$, $R_2$, and $R_3$ radicals in each instance.

| Oxime | $R_1$ | $R_2$ | The Acid Chloride of — | $R_3$ |
|---|---|---|---|---|
| disodium salt of dimethylglyoxime. dimethylglyoxime. nickel complex of dimethylglyoxime. | $CH_3-$ $CH_3-$ $CH_3-$ | $CH_3-$ $CH_3-$ $CH_3-$ | succinic acid glutaric acid adipic acid pimelic acid suberic acid azelaic acid sebacic acid oxalic acid | $-(CH_2)_2-$ $-(CH_2)_3-$ $-(CH_2)_4-$ $-(CH_2)_5-$ $-(CH_2)_6-$ $-(CH_2)_7-$ $-(CH_2)_8-$ carbon-to carbon single bond |
| nickel complex of α-benzildioxime. | phenyl | phenyl | fumaric acid | $-CH=CH-$ |
| α-furildioxime | furyl | furyl | isophthalic acid | m-phenylene |
| glyoxaldioxime monomethylglyoxime | $H-$ $CH_3-$ | $H-$ $H-$ | terephthalic acid | p-phenylene |
| benzildioxime | phenyl | phenyl | | |
| methylethylglyoxime cyclohexane-1,2-dione-dioxime. | $CH_3-$ $R_1$ and $R_2$ are part of a single group $-ON$ | $CH_3CH_2-$ $NO-$ thiophene ring | α,α'-dicarboxy-p-xylene | $-CH_2-$ phenylene $-CH_2-$ |
| | | | α,α'-dicarboxy-m-xylene | $-CH_2-$ m-phenylene with $CH_2-$ |

According to my invention, $R_1$, $R_2$, and $R_3$ need not be constant in each structural repeat unit of the polymer, as defined by the general formula indicated above. It is within the scope of the invention to prepare new polymers with a mixture of two or more polyfunctional oximes and/or a mixture of two or more acid chlorides, in which event the various co-monomers may enter the polymeric chain in random fashion. Under such circumstances, $R_1$ groups, for example, in adjacent repeat units of the polymer may be the same, or they may be different. Similarly, polymers prepared with an acid chloride or oxime which is structurally unsymmetrical may result in a polymeric structure in which the $R_1$, $R_2$, and $R_3$ groups of all repeat units do not correspond exactly. For example, a polyoxime ester of monomethylglyoxime or methylethylglyoxime would almost certainly have some repeat units in which the relationship of $R_1$ and $R_2$ is the mirror image opposite of their order of occurrence in various other repeat units. This would result from the lack of symmetry in such dioximes, which are more or less free to enter the polymer molecule in random fashion as the molecule is formed. All such polymers are intended as being within the scope of the present invention along with those which are formed from a single pair of symmetrical co-monomeric polyfunctional oxime and acid chloride.

The new polymers are, for the most part, thermoplastic and, with the exception of the very few that are liquid at room temperature or are infusible, may be used for the preparation of common plastic objects such as plastic spoons, cups, kitchen utensils, eye glass frames, and the like by conventional compression molding and injection molding techniques. For example, a portion of the polydimethylglyoxime sebacate obtained in Example 7 was formed into elongated rods at 110° C. and 8000 p.s.i. in a conventional compression molding apparatus at a dwell time of 30 seconds per cycle.

The new polymers of the present invention may also be used as encapsulating resins to serve as housings or containers for industrial apparatus and equipment.

The new polymers may also be used in the manufacture of red and orange-red pigments by first contacting the polymers with an aqueous solution of a soluble nickel salt, such as nickel chloride, at a pH greater than 3. The nickel chelate of each of these polymers which is thus obtained is always a bright red or red-orange in color and may be used for the preparation of full-shade pigments. This may be demonstrated by mixing 25 parts of the water-insoluble pulverulent polymeric nickel chelate with 100 parts of an 80/20 (v./v.) mixture of boiled linseed oil and mineral spirits. If this mixture is thoroughly dispersed on a conventional ball mill for 70–80 hours and then sprayed onto a metal test panel, a smooth, glossy finish of full-shade red or orange-red color results which does not easily crack or peel off. For example, a coating composition was formulated using this procedure with a portion of the polydimethylglyoxime adipate obtained in Example 4 as the pigment. When applied to metal test panels the composition produced a smooth, dark-red finish having an ASTM gloss rating of 83 at 60° C.

The new polymers and a suitable method for preparing them has been described in detail in the foregoing specification. It will be readily apparent to those skilled in the art that many widely different embodiments of this invention may be practiced without departing from the spirit or scope thereof, and therefore it is not intended that the invention should be limited in any way except as defined in the ensuing claims. What I claim as my invention is:

1. A polymer consisting essentially of repeat units having the formula:

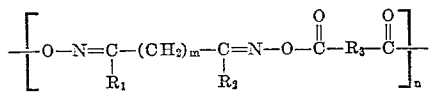

wherein each of $R_1$ and $R_2$ are selected from the class consisting of hydrogen, a lower alkyl radical, an aromatic radical, a furyl radical, and an alicyclic radical containing both $R_1$ and $R_2$ in the ring, and wherein $R_3$ is selected from the group consisting of a methylene group, a polymethylene radical, a phenylene radical, an alkenylene radical, and a direct carbon-to-carbon single bond, and wherein $n$ is an integer greater than one, and $m$ is an integer less than two.

2. Polydimethylglyoxime succinate.
3. Polydimethylglyoxime adipate.
4. Polydimethylglyoxime sebacate.
5. Polydimethylglyoxime terephthalate.
6. Polydimethylglyoxime fumarate.
7. A process for the preparation of a linear polymer which includes the essential step of contacting a dioxime with a dibasic organic carboxylic acid chloride in an organic solvent, said dioxime and said acid chloride being present in an essentially 1:1 mole ratio.
8. A process for the preparation of a polydimethylglyoxime succinate polymer composition which comprises condensing a compound selected from the class consisting of dimethylglyoxime and metallic salts of dimethylglyoxime with succinyl chloride in an inert organic solvent.
9. A process for the preparation of a polydimethylglyoxime adipate polymer composition which comprises condensing a compound selected from the class consisting of dimethylglyoxime and the metallic salts of dimethylglyoxime with adipyl chloride in an inert organic solvent.
10. A process for the preparation of a polydimethylglyoxime sebacate polymer composition which comprises condensing a compound selected from the class consisting of dimethylglyoxime and the metallic salts of dimethylglyoxime with sebacyl chloride in an inert organic solvent.
11. A process for the preparation of a polydimethylglyoxime terephthalate polymer composition which comprises condensing a compound selected from the class consisting of dimethylglyoxime and the metallic salts of dimethylglyoxime with terephthaloyl chloride in an inert organic diluent.
12. A process for the preparation of a polydimethylglyoxime fumarate which polymer composition comprises condensing a compound selected from the class consisting of dimethylglyoxime and the metallic salts of dimethylglyoxime with fumaryl chloride in an inert organic diluent.
13. A process as in claim 12 in which the polymeric composition is subsequently cross-linked by reaction with an olefinic cross-linking agent.
14. A polymer consisting essentially of repeat units having the formula

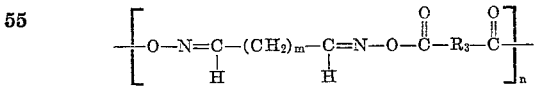

wherein $R_3$ is selected from the group consisting of a methylene group, a polymethylene radical, a phenylene radical, an alkenylene radical, and a direct carbon-to-carbon single bond, and wherein $n$ is an integer greater than one and $m$ is an integer less than two.

15. A polymer consisting essentially of repeat units having the formula

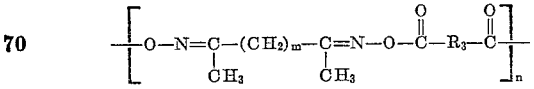

wherein $R_3$ is selected from the group consisting of a methylene group, a polymethylene radical, a phenylene radical, an alkenylene radical, and a direct carbon-to-carbon single bond, and wherein $n$ is an integer greater than one and $m$ is an integer less than two.

16. A polymer consisting essentially of repeat units having the formula

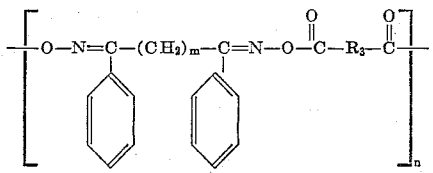

wherein $R_3$ is selected from the group consisting of a methylene group, a polymethylene radical, a phenylene radical, an alkenylene radical, and a direct carbon-to-carbon single bond, and wherein $n$ is an integer greater than one and $m$ is an integer less than two.

References Cited in the file of this patent

UNITED STATES PATENTS

| | | |
|---|---|---|
| 2,260,256 | Lippincott | Oct. 21, 1941 |
| 2,444,827 | Johnson | July 6, 1948 |
| 2,465,319 | Whinfield et al. | Mar. 22, 1949 |
| 2,512,632 | Wotherspoon et al. | June 27, 1950 |
| 2,732,404 | Kamlet | Jan. 24, 1956 |
| 2,749,358 | Reilly | June 5, 1956 |

FOREIGN PATENTS

| | | |
|---|---|---|
| 894,414 | France | Dec. 22, 1944 |

OTHER REFERENCES

Degering: An Outline of Organic Chemistry, University Litho (1950), pages 181, 182.

Claisen et al.: Berichte, vol. 22, pages 526–530 (1889).

Kienle et al.: Journ. Am. Chem. Soc., vol. 63, pages 481, 484 (1941).

Hantzsch: Berichte, vol. 24 (1891), page 39.

UNITED STATES PATENT OFFICE
CERTIFICATE OF CORRECTION

Patent No. 3,026,303                 March 20, 1962

Lorraine Guy Donaruma

It is hereby certified that error appears in the above numbered patent requiring correction and that the said Letters Patent should read as corrected below.

Column 8, in the table, column 5, lines 5 to 7 thereof, for $$-(CH_2)t- \quad\quad\quad -(CH_2)_6-$$
$$-(CH_2).- \quad \text{read} \quad -(CH_2)_7-$$
$$-(CH_2)4- \quad\quad\quad -(CH_2)_8-$$

column 10, line 43, strike out "which" and insert the same after "composition", in same line 43; column 11, line 2, for "carcbon" read -- carbon --.

Signed and sealed this 4th day of September 1962.

(SEAL)
Attest:
ERNEST W. SWIDER
Attesting Officer

DAVID L. LADD
Commissioner of Patents